US007697506B2

(12) United States Patent
Narin et al.

(10) Patent No.: US 7,697,506 B2
(45) Date of Patent: Apr. 13, 2010

(54) SYSTEM AND METHOD FOR ENHANCED COMPUTER TELEPHONY INTEGRATION AND INTERACTION

(75) Inventors: Attila Narin, Bothell, WA (US); Jonathan Jay Cadiz, Redmond, WA (US); Anoop Gupta, Woodinville, WA (US); Michael Boyle, Calgary, CA (US); Gavin Jancke, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1551 days.

(21) Appl. No.: 10/651,468

(22) Filed: Aug. 29, 2003

(65) Prior Publication Data

US 2005/0047395 A1   Mar. 3, 2005

(51) Int. Cl.
*H04L 12/66* (2006.01)
*H04L 12/56* (2006.01)

(52) U.S. Cl. ..................................... 370/352; 370/401
(58) Field of Classification Search ......... 370/352–356, 370/400, 401
See application file for complete search history.

(56) References Cited

U.S. PATENT DOCUMENTS

| | | | |
|---|---|---|---|
| 6,026,158 A | 2/2000 | Bayless et al. | |
| 6,259,449 B1 | 7/2001 | Saxena et al. | |
| 6,298,127 B1* | 10/2001 | Petrunka | 379/126 |
| 6,445,694 B1 | 9/2002 | Swartz | |
| 6,459,782 B1 | 10/2002 | Bedrosian et al. | |
| 6,477,374 B1 | 11/2002 | Shaffer et al. | |
| 6,549,621 B1* | 4/2003 | Christie et al. | 379/230 |
| 6,563,914 B2 | 5/2003 | Sammon et al. | |
| 6,573,705 B1 | 6/2003 | Tajima et al. | |
| 6,621,800 B1* | 9/2003 | Klein | 370/282 |
| 6,675,640 B2 | 1/2004 | Ehrlich et al. | |
| 6,778,661 B1* | 8/2004 | Yumoto et al. | 379/265.09 |

(Continued)

FOREIGN PATENT DOCUMENTS

FR    2824980    11/2002

(Continued)

OTHER PUBLICATIONS

European Search Report for EP Application No. 04 02 0332, Dec. 8, 2004.

(Continued)

*Primary Examiner*—Pankaj Kumar
*Assistant Examiner*—Marcus R Smith
(74) *Attorney, Agent, or Firm*—Perkins Coie LLP

(57) ABSTRACT

An enhanced computer telephony integration system that facilitates the interaction and integration of a private branch exchange (PBX) with a client computer on a computer network. An enhanced telephony (ET) server connects to the PBX and to all running instances of an ET client on a user's computers. The ET server acts as a proxy between the ET clients and the PBX. The ET clients register with the ET server for a certain telephone extension. The ET server then can forward telephone action requests (such as placing a telephone call) from the registered ET clients to the PBX servicing the telephone extension. Moreover, the ET server can relay telephone events (such as an incoming call) from the PBX to all registered clients. The ET server facilitates seamless integration of telephone and personal computer features to provide a rich user-controlled computer-telephone integration for a user.

21 Claims, 7 Drawing Sheets

U.S. PATENT DOCUMENTS

| | | | |
|---|---|---|---|
| 6,782,086 B2 * | 8/2004 | Clapper | 379/142.06 |
| 6,882,724 B2 * | 4/2005 | Hartmeier | 379/265.03 |
| 7,035,248 B2 * | 4/2006 | Wengrovitz | 370/352 |
| 7,092,385 B2 * | 8/2006 | Gallant et al. | 370/352 |
| 7,145,899 B1 * | 12/2006 | Pearce et al. | 370/352 |
| 7,257,201 B2 * | 8/2007 | Singh et al. | 379/88.13 |
| 2001/0002831 A1 | 6/2001 | Kato et al. | |
| 2002/0015003 A1 | 2/2002 | Kato et al. | |
| 2002/0073207 A1 | 6/2002 | Widger et al. | |
| 2002/0110121 A1 | 8/2002 | Mishra | |
| 2004/0076272 A1 | 4/2004 | Zafar et al. | |
| 2004/0235520 A1 | 11/2004 | Cadiz et al. | |
| 2009/0207991 A1 | 8/2009 | Cadiz et al. | |
| 2009/0214014 A1 | 8/2009 | Cadiz et al. | |

FOREIGN PATENT DOCUMENTS

| | | |
|---|---|---|
| JP | 63087898 | 4/1988 |
| JP | 63280524 | 11/1988 |
| JP | 1190062 | 7/1989 |
| JP | 05095392 | 4/1993 |
| JP | 07182372 | 7/1995 |
| JP | 08317076 | 11/1996 |
| JP | 09153929 | 6/1997 |
| JP | 9289526 | 11/1997 |
| JP | 9512690 | 12/1997 |
| JP | 10240656 | 9/1998 |
| JP | 11098252 | 4/1999 |
| JP | 11161706 | 6/1999 |
| JP | 11331895 | 11/1999 |
| JP | 2000261554 | 9/2000 |
| JP | 2000341414 | 12/2000 |
| JP | 2001169319 | 6/2001 |
| JP | 2001339527 | 7/2001 |
| JP | 2001519101 | 10/2001 |
| JP | 2001320748 | 11/2001 |
| JP | 2002033800 | 1/2002 |
| JP | 2002064639 | 2/2002 |
| JP | 2002101183 | 4/2002 |
| JP | 2002191070 | 7/2002 |
| JP | 2002218058 | 8/2002 |
| JP | 2002232566 | 8/2002 |
| JP | 2002354518 | 12/2002 |
| JP | 2002374354 | 12/2002 |
| JP | 2003188978 | 7/2003 |
| JP | 2003219010 | 7/2003 |
| JP | 2003219469 | 7/2003 |
| JP | 2003283693 | 10/2003 |
| JP | 2003296522 | 10/2003 |
| JP | 2003324543 | 11/2003 |
| WO | WO 00/49794 | 8/2000 |
| WO | WO 02/093892 | 11/2002 |

OTHER PUBLICATIONS

Ericsson Enterprise brochure entitled, "BusinessPhone Computer Telephony Platforms", available at: http://www.ericsson.com/enterprise/library/brochures_datasheets/BusinessPhone/Bp_1023676.pdf, produced in Aug. 2003.

Genesys tutorial entitled, Network Computer-Telephony (CTI) Delivering Intelligent Network (IN) Services, available at: http://www.komunikasi.org/acrobat/service/Network_CTI.pdf.

http://www.alexis.com/.

http://www.databasesystemscorp.com/pscti.htm.

http://www.edial.com/.

http://www.e-zest.net/cti-India.html.

http://www.oak.co.uk/cti2.htm.

http://www.siemens.com/index.jsp?sdc_p=pHPo14674fcls4mnu0.

http://www.toshiba.com/taistsd/pages/prd_cti_main.html.

http://www.voicecallcentral.com.

http://www.voicecallcentral.com/advancedcallcenter.htm.

Kaukonen, Saku, "Software Agents for Mobile Computer Telephone Integration", available at: http://control.hut.fi/Hyotyniemi/Publications/2000_arpakannus/SakuKaukonen.pdf, pp. 18-21, Feb. 2000.

Lucent Technologies paper entitled, "CTI Computer Telephony Integration", in *INDeX*, pp. 1-12, available at: http://www.getech.co.uk/products/telecoms/ctibrochure.pdf, (2000).

Matsushima, H., Toshiyuki, S., Takashi, S., and Toshiaki, K., "Integration of Computer Networks and Telephony Systems—Computer Telephony Integration", in *Hitachi Review*, vol. 48 (1998), No. 2, pp. 55-58.

Strathmeyer, Carl, R., "Choosing a Computer-Telephone Server", originally published in *The 1996 International VoicePower Directory and Buyer's Guide*, pp. 24-26, 1996, and also available at: http://www.intel.com/network/csp/pdf/vp96.pdf.

Co-pending U.S. Appl. No. 10/445,395, "Enhanced Telephony Computer User Interface Allowing User Interaction and Control of a Telephone Using a Personal Computer", filed May 20, 2003.

Provisional U.S. Appl. No. 60/275,031, filed Mar. 13, 2001.

* cited by examiner

| EXTENSION | PORT | UGP | ADDITIONAL TELEPHONE INFORMATION |
|---|---|---|---|
| X 51918 | 001.3.08.05 | 4 | ..... |
| X 52985 | 001.6.04.02 | 52 | ..... |
| ..... | ..... | ... | ..... |
| X 25267 | 002.2.08.04 | 96 | ..... |

SYSTEM AND METHOD FOR ENHANCED COMPUTER TELEPHONY INTEGRATION AND INTERACTION

TECHNICAL FIELD

This invention relates in general to integrated computer telephony and in particular to an enhanced computer telephony integration system and method that allows a server computer to interface with telephone switching devices and client computers to seamlessly integrate telephone and personal computer features to provide a rich user-controlled computer-telephone integration.

BACKGROUND OF THE INVENTION

Personal computers and telephones are two indispensable devices in modern life. Personal computers (PCs) and telephones both provide the ability to communicate instantaneously with others virtually anywhere in the world. In addition, PCs have revolutionized modern society with their ability to process information and data and to provide a user interaction with this information and data. PCs also have the capability to control other devices. This capability, for example, allows a user to remotely control the peripheral device through a user interface, often graphical user interfaces. Even though the PC and telephone often exist in the same room, however, there currently exist few attempts to provide a useful integration of the two devices that takes full advantage of their strengths.

There have been many attempts at integrating the telephone with the personal computer, but with little market success. These failures are due to in part to problems with the product design including, for example, poor user interface design, the need for expensive additional hardware, and unrealistic user expectations. In addition, these products do not allow a user to access a telephone from a location different from the physical location of the telephone.

One product example is the Microsoft® Phone, which was included in Microsoft Windows® 95. Microsoft® Phone is a software-only speakerphone and answering machine that allowed a user to use their computer as a speakerphone. The Microsoft® Phone, however, required that the computer always be on (which was an unrealistic expectation in the Windows® 95 era) and was an expensive added feature to Windows® 95 because it required additional hardware. Moreover, the Microsoft® Phone has limited functionality.

Another product example that attempts to integrate the telephone with the personal computer is the IBM® Realphone. The IBM® Realphone is a telephone-dialing program that is modeled after a standard business telephone. The Realphone interface is a picture of the business telephone on the display. One problem, however, is that the advantageous synergies of the telephone and the computer are not merged. For example, the interface requires a user to use an input device (such as a mouse) to press the telephone keypad on the screen and dial a desired telephone number, as one would dial a real telephone. However, this type of interface is difficult, laborious and time-consuming for a user.

There has been greater product success with integrating the telephone and the computer in the call center environment. For example, the call center environment (such as customer support and telemarketing centers) often includes software applications that provide telephone information such as a telephone queue display (the order of callers in a queue), a display of how many calls are waiting, and the ability to route calls to representatives. These software applications are designed for the customer service audience, however, and there is little or no attempt to meet the need of the private user or provide a user-friendly integration of the physical telephone and the software interface. For the call center audience, a priority is to increasing call throughput and quickly assigning calls in the queue, while the user experience is not. Moreover, telephony applications for the call center environment lack functionality and control features needed by an end-user that are critical for a high-quality user experience.

Therefore, there exists a need for an enhanced computer telephony integration system and method that enables a user interface to allow a user to seamlessly interact with a telephone using a personal computer. The enhanced computer telephony integration system and method facilitates a rich variety of functionality and take advantage of the processing power of the computer to enhance a telephone's capabilities. Moreover, enhanced computer telephony integration system and method provides a tight coupling between the personal computer and the telephone such that a user is unaware of any division between the two and facilitates the user of personal computer features to provide a rich user-controlled computer-telephone integration.

SUMMARY OF THE INVENTION

The invention disclosed herein includes an enhanced computer telephony integration system that facilitates the interaction and integration of a private branch exchange with a client computer on a computer network. An enhanced telephony (ET) server acts as a proxy between client computers on the network running ET client software and a private branch exchange (PBX) that handles telephone services for an enterprise. In general, one or more ET clients register with the ET server for a certain telephone extension. A typical application is having a telephone in a user's office connected to a telephone extension and all of the user's computers registered for that extension. The ET server forwards telephone action requests (such as placing a telephone call) from the registered ET clients to the PBX servicing the telephone extension. Moreover, the ET server relays telephone events (such as an incoming call) from the PBX to all registered clients. The ET server facilitates seamless integration of telephone and personal computer features to provide a rich user-controlled computer-telephone integration for a user.

The ET system and method overcomes problems with prior attempts to integrate the PC and the telephone. Specifically, the ET server facilitates the user of a rich variety of functionality on the ET client that leverages the fact that the PC has considerably more processing power and greater access to variety of data than the ordinary telephone. This processing power and data access is used to the user's advantage as the telephone's capabilities and functionality are greatly expanded. Moreover, the ET server provides a tight coupling between the personal computer and the telephone such that a user is unaware of any division between the two. This seamless integration, along with enhanced functionality, greatly simplifies and improves the user experience.

The ET system and method make it possible for a user to be at a different physical location from the telephone and still be able to control the telephone from an ET client connected to an ET server. The only requirement is that the ET client and ET server be network connected. Thus, the user, as long as he has access to the network, can control the telephone from virtually anywhere. The ET system and method is designed to control and manage a single telephone or multiple telephones, including cellular phones, cordless phones, and desk phone.

Moreover, these telephones can be located at different locations, such as a mobile phone, a home phone and a work phone.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Although the telephone and the personal computer are a major part of most people's everyday lives, the two remain largely disconnected from each other. There exists certain specialized applications exist that link the two devices for use in areas such as telemarketing and customer service centers. However, applications for personal and home use are not readily available. The enhanced telephony (ET) system and method describe herein facilitates the use of rich user interface features running on a client computer. Specifically, the ET system and method facilitates client computer control of a telephone and notification through the client computer of telephone events associated with an extension. This functionality brings computer-telephony to the personal computer desktop to provide a user with a rich interactive experience that integrates computer and telephony features for general use.

II. Enhanced Telephony (ET) Environment

The enhanced telephony (ET) system and method is designed to operate in a combined telecommunications and computing environment. In particular, the ET system and method are implemented on a computing device, preferably a server computing device. The ET system and method running on the server computing device is in network communication with all instances of ET running on client computing devices as well as in communication with a private branch exchange (PBX). The ET system and method acts as a proxy between the ET clients and the PBX. For example, the ET system and method forwards requests from clients to the PBX and also relays phone events from the PBX to the appropriate clients.

Figure 1:
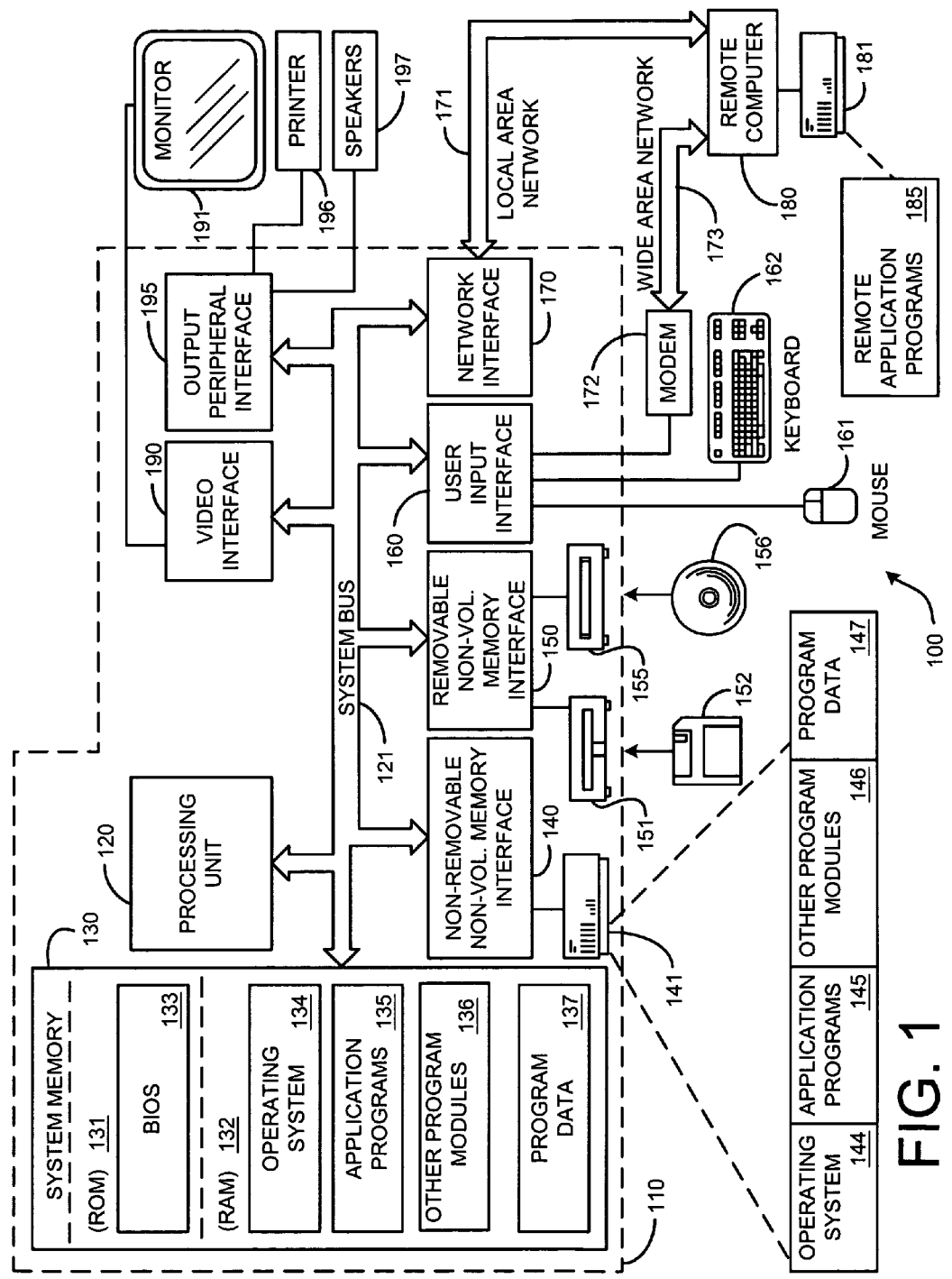
FIG. 1 illustrates an example of a suitable computing system environment in which the ET system and method may reside.

The following discussion is intended to provide a brief, general description of a suitable computing environment in which the ET system and method may be implemented. FIG. 1 illustrates an example of a suitable computing system environment 100 in which the ET system and method may reside. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The ET system and method is operational with numerous other general purpose or special purpose computing system environments or configurations. Examples of well known computing systems, environments, and/or configurations that may be suitable for use with the ET system and method include, but are not limited to, personal computers, server computers, hand-held, laptop or mobile computer or communications devices such as cell phones, PDAs, merged cell phones and PDAs, multiprocessor systems, microprocessor-based systems, set top boxes, programmable consumer electronics, network PCs, minicomputers, mainframe computers, distributed computing environments that include any of the above systems or devices, and the like.

The ET system and method may be described in the general context of computer-executable instructions, such as program modules, being executed by a computer. Generally, program modules include routines, programs, objects, components, data structures, etc., that perform particular tasks or implement particular abstract data types. The ET system and method may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the ET system and method includes a general-purpose computing device in the form of a computer 110.

Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
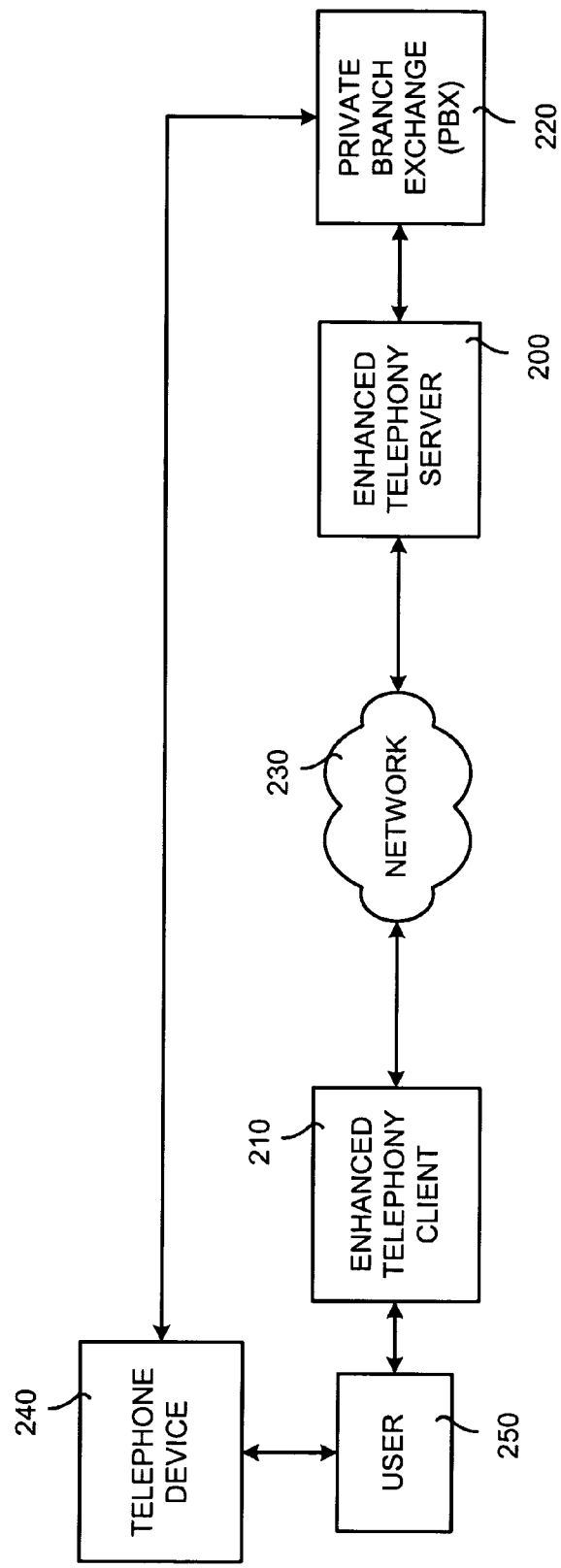
FIG. 2 is a general block diagrams illustrating the general arrangement between the computing and telephone environments.

The ET system and method also is designed to operate in a telecommunications environment. FIG. 2 is a general block diagrams illustrating the general arrangement between the computing and telephone environments. FIG. 2 illustrates an implementation of the ET system and method incorporated into the computing and telephone environments. In this implementation, the ET system and method is implemented as an ET server 200. The ET server 200 is in two-way communication with at least one ET client 210 and at least one private branch exchange (PBX) 220. The ET client 210 communicates with the ET server 200 over a network 230. A telephone device 240 is connected to the PBX 220, and the PBX 220 is in two-way communication with the ET server 200. A user 250 typically has the telephone device 240 and the ET client 210 at hand or nearby. For example, the user 250 typically will have both the telephone device 240 and the ET client 210 in an office. In effect, the ET server 200 acts as a proxy and interpreter between the ET client 210, the telephone device 240 and the PBX 220.

III. Enhanced Telephony (ET) System

The ET system and method provides functionality to a user interfacing with a telephone and an ET client such that the user is provided with a rich user telephony experience. The user can use his computer running ET client software to control his telephone and receive information about his telephones through the computer. This rich integration and merging of the telephone and the computer are based on the ability of the ET system and method described herein to communicate information from the PBX to a computer running ET client software and vice versa.

Figure 3:
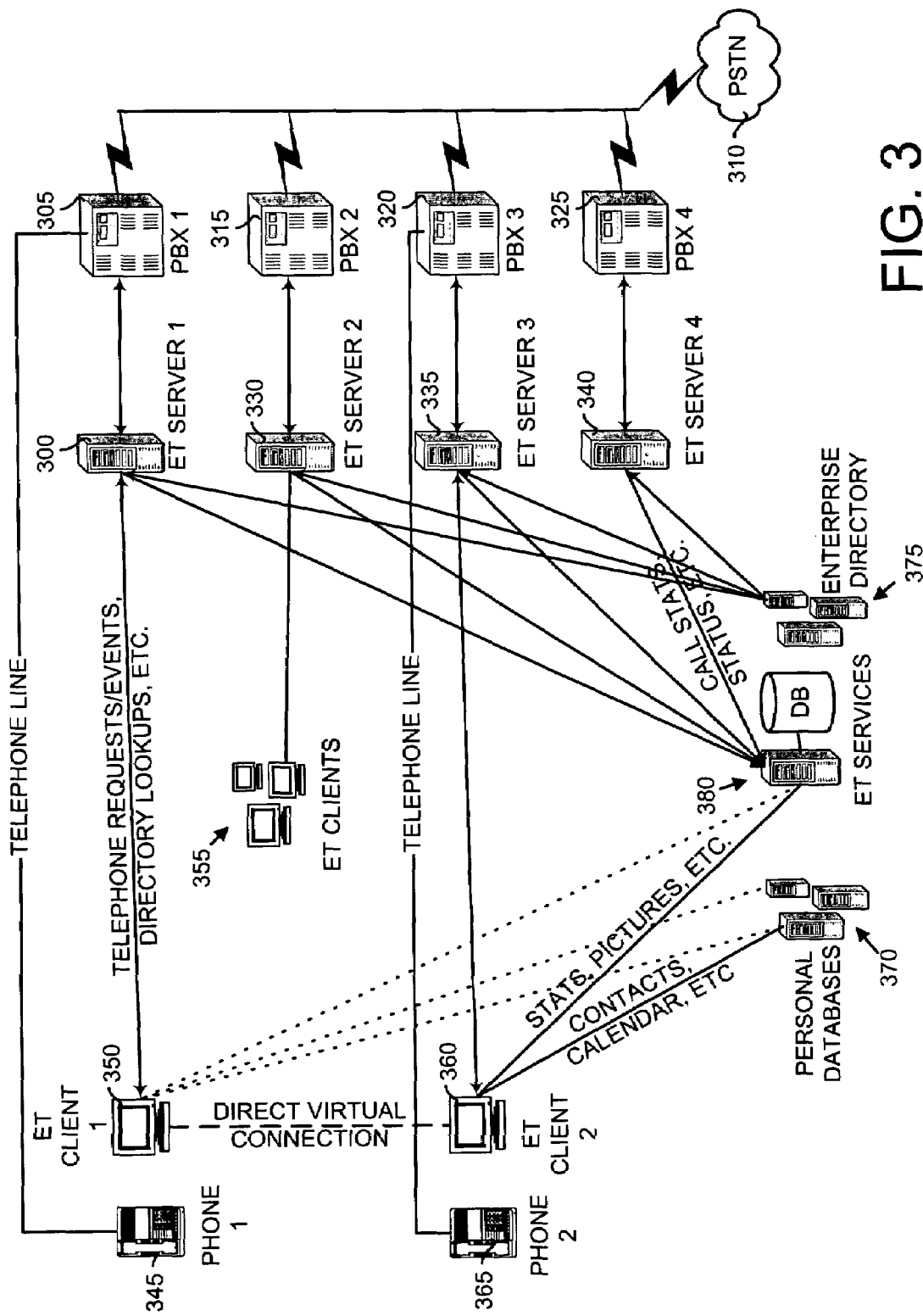
FIG. 3 is a general overview of a typical implementation of the ET system and method in an enterprise environment and is shown for illustrative purposes only.

FIG. 3 is a general overview of a typical implementation of the ET system and method in an enterprise environment and is shown for illustrative purposes only. In particular, a first ET server 300 is connected to a first private branch exchange (PBX) 305. The first PBX 305 is connected to a public switched telephone network (PSTN) 310. An enterprise (such as a corporation, university or government agency) typically owns a plurality of PBXs, as shown in FIG. 3 as a second PBX 315, a third PBX 320 and a fourth PBX 325. Each of these PBXs 315, 320, 325 is connected to the PSTN 310. An associated ET server is connected to each of the PBXs 315, 320, 325, namely a second ET server 330, a third ET server 335 and a fourth ET server 340. It should be noted that a greater or fewer number of ET servers and PBXs may be used, depending on the needs and size of the particular enterprise. Typically, however, there is at least one ET server for every PBX.

A first telephone (such as a speakerphone) 345 is connected to and serviced by the first PBX 305. A first ET client computer 350, running at least one instance of ET client software, is connected to the first ET server 300. Typically, this connection is a network connection. The second ET server 330 is connected to a plurality of ET clients 355 via network connections. A third ET client computer 360, running at least one instance of ET client software, is connected to the third ET server 335 via a network connection. In addition, a second telephone 365 is connected to and serviced by the third PBX 320.

Also shown in FIG. 3 is a direct virtual connection between the first ET client 350 and the third ET client 360. This direct virtual connection between two (or more) ET clients is facilitated by the User Data Transfer feature of ET server. This feature is discussed in detail below, but basically, in the case shown in FIG. 3, upon request the first ET server 300 sends user data (such as network address information) for the first ET client 350 to the third ET client 360. This enables the third ET client 360 and the first ET client 350 to establish a peer-to-peer session without having to go through any of the ET servers. One instance where this is useful is a screen sharing feature of the ET client, where one user can share his screen with another user. Screen sharing is enabled if the user and a caller are in a call and if both callers are on the corporate network. A second instance where a direct virtual connection between clients is useful is for an easy transfer feature of the ET client. The easy transfer feature allows a user to sends a file while in a call, and allows the user to share multiple copies of the file while in a call with whomever the user chooses.

The fourth ET server 340 shown in FIG. 3 manages various sources of information contained in databases in communication with the server 340 and facilitates their use for ET client users. These sources include personal databases, enterprise databases, and public databases. The personal databases include application-specific databases (such as e-mail, Outlook, instant messenger, and calendar databases), the enterprise databases include the hierarchy of the corporation, corporate addresses, calendar database, and picture databases, and the public databases include public Internet sites and online telephone books. Depending on the nature of its contents, a database may reside on either an ET server, an ET client, or both. For example, personal address books and calendar information (from the personal databases) may reside on an ET client (such as a user's personal computer), while the corporate hierarchy (from the enterprise databases) may reside on an ET server.

In FIG. 3, personal databases are shown residing on the third client 360 and an exchange server 370. Corporate databases are shown residing on an enterprise directory server 375. The enterprise directory server 375 is in communication with the fourth ET server 340 as well as each of the other ET servers 300, 330, 335. As explained in detail below, this is to provide periodic updating of an ET version of the enterprise directory to each of the ET servers. An ET services server 380 contains ET-specific database such as ET logs and server status. In addition, the ET services server 380 contains picture databases (for providing an ET client with pictures of other users). It should be noted that the ET servers 300, 330, 335, 340, the ET clients 345, 355, 360, the exchange server 370, the enterprise server 375, and the ET services server 380 are all in network communication.

Each of the ET servers translates higher-level telephony data and commands from an ET client into PBX data and commands (or events). Similarly, the ET servers reverse the process by translating PBX events from the PBX into higher-level telephone events, which may be forwarded to ET clients. This typically is achieved using a PBX-specific software development kit that allows programming access to the PBX. This programming access may differ between various brands and models of PBX. In a working example of the ET system and method, the PBXs were manufactured by Intecom and the ET servers used Intecom's Open Application Interface (OAI) Toolkit to connect to the Intecom PBXs. This OAI toolkit allows the controlling of telephones/extensions, in addition to obtaining events for telephones/extensions serviced by the PBX. It should be noted that the enhanced computer telephony integration system and method described herein also may be practiced on other brands of PBXs and telephone systems.

While extensions are commonly used to identify a telephone and associated telephone line, the extension alone may not be enough. Frequently, an extension needs to be mapped to PBX-specific information (such as ports, etc.). To facilitate translation to and from PBX-specific information by the ET server 200, it is necessary to identify a telephone extension using PBX-specific information. The ET server 200 constructs a database that maps extensions to this PBX-specific information. This database, called the switch database, is created at startup of the ET server 200 and is refreshed periodically. In a preferred embodiment, the switch database is updated once a day (such as every evening).

The ET server 200 translates data from the ET clients into data for the PBXs, and vice versa. In general, the ET client data is a higher-level data and the PBX data is a lower-level data. Lower-level data is data that is received from and transmitted to the PBX. This lower-level data is in a format and a language that the PBX understands. Higher-level data is what conceptually happens as far as the telephone is concerned.

By way of example and not limitation, suppose a user wants to place a call from her extension (x7374) to another extension (x9811). The ET server 200 facilitates the exchange and translation of information between the user's ET client and the PBX. In this case, the ET client would send the higher-level command to "place a call on extension 7384 to extension 9811." The ET server 200 would translate the higher-level request from the ET client in an equivalent lower-level command of "toggle the speakerphone at port 001.2.12.5, take line 7384 off hook, place call on line 7384 port 001.2.12.5 UGP 4 to call number 9811". The same thing happens in reverse when telephone events (such as an incoming call) are received by the PBX and sent to an ET client.

The lower-level data of the PBX typically is in a complicated data structure format and the ET server 200 typically needs to extract one or more parameters out of the lower-level data structure. These parameters then are mapped to a higher-level event. These parameters typically are PBX-specific data. In other words, the parameters that a particular PBX needs and uses as input and output are dependent on the make and brand of the PBX. Once the ET server 200 knows the PBX-specific data that a particular PBX needs, the server 200 use that knowledge to obtain the parameters needed for the translation or conversion from higher-level data to lower-level data and vice versa.

Once a translation has been performed, the server provides the translation of the data and command to the intended recipient. In the above example, after the ET server 200 translates the lower-level command it then notifies the ET client of the event in the higher-level command format that the ET client comprehends. Alternatively, after the ET server 200 translates a higher-level command it then notifies the PBX of the event in the lower-level command format that the PBX understands. It should be noted that several lower-level commands may be combined into a single higher-level command. Similarly, a single lower-level command may generate two or more higher-level commands.

Figure 4A:
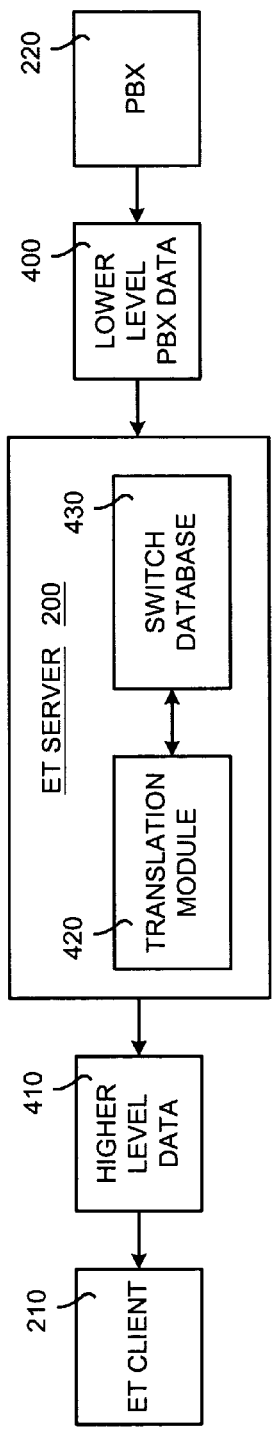
FIG. 4A is a block diagram illustrating the translation by the ET server of PBX data into higher-level data that the ET client understands.

FIG. 4A is a block diagram illustrating the translation by the ET server 200 of PBX data 400 into higher-level data 410 that the ET client 210 can understand. In particular, the PBX 220 receives an event (such as an incoming call) and sends that event to both the intended telephone and the ET server 200. The PBX event is a received by the ET server 200 as lower-level PBX data 400. The ET server 200 includes a translation module 420 that translates lower-level PBX data into higher-level data for the ET client 210 and vice versa. The ET server 200 also includes a switch database 430 (discussed below) that facilitates the translation by the translation module 420. Output of the translation module 420 is the higher-level data 410 that can be understood by the ET client 210.

Figure 4B:
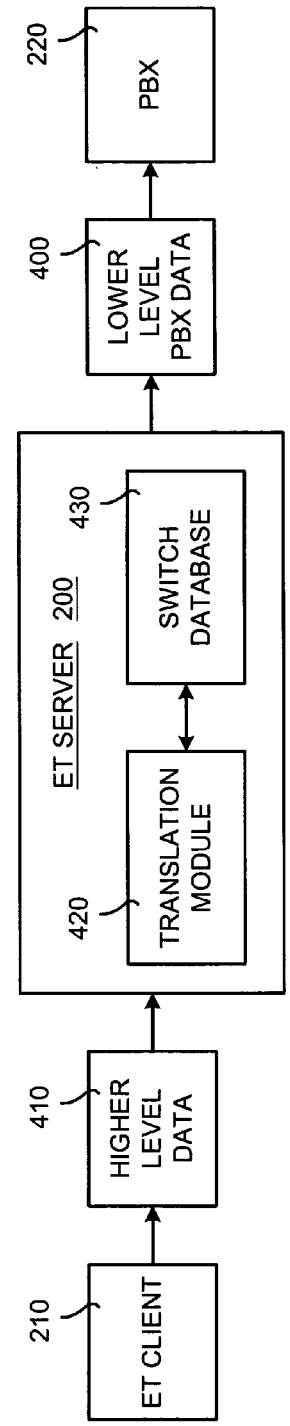
FIG. 4B is a block diagram illustrating the translation by the ET server of higher-level data that the ET client understands into lower lever PBX data that the PBX understands.

FIG. 4B is a block diagram illustrating the translation by the ET server 200 of higher-level data 410 that the ET client can understand into lower lever PBX data 400 that the PBX can understand. Similar to FIG. 4A, the higher-level data 410 from the ET client 210 is translated by the translation module 420 using the switch database 430. The result is the lower-level PBX data 400 that the PBX 220 can understand. This translation process by the ET serve 200 allows the PBX 220 and the ET client 210 to communicate with each other by having the ET server 200 pass information between the two.

Figures 5, 6:
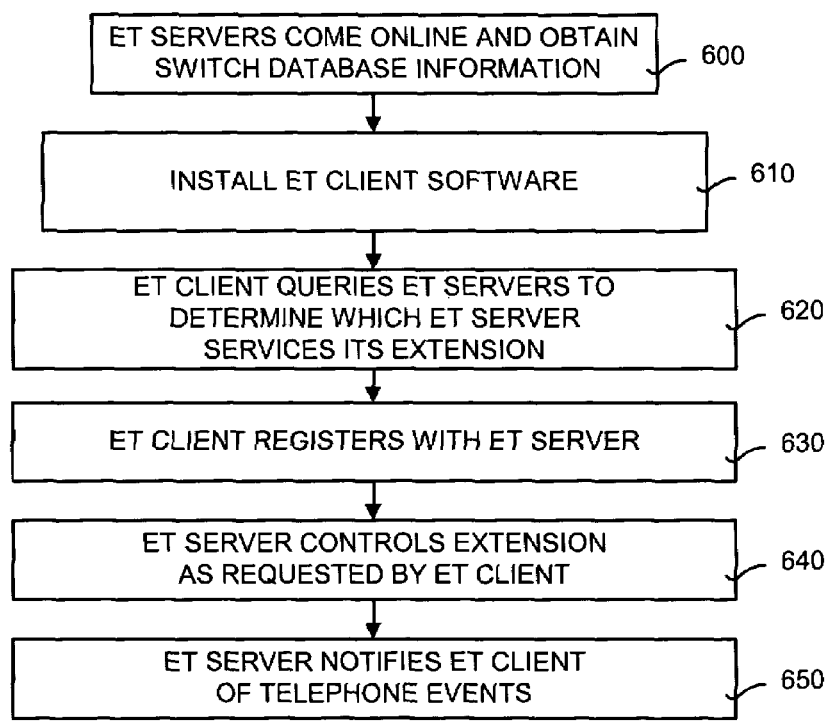
FIG. 5 is a specific implementation of PBX-specific information that can be contained in the switch database.
FIG. 6 is a general flow diagram illustrating a general overview of the ET method.

FIG. 5 is a specific implementation of PBX-specific information that can be contained in the switch database. Data to populate the switch database 500 is obtained from the PBX as lower-level PBX data 400. Specifically, as shown in FIG. 5, which is an implementation of data specific to Intecom PBXs, for each telephone the Switch DB contains the following data. In the first column, the telephone extensions serviced by the PBX are listed. In the example shown in FIG. 5, the extension is a five-digit extension. For each extension, a port is listed in the second column. In this example, the port includes four numbers that indicate the physical connection between telephone and PBX. This includes, by way of example, the cabinet, shelf, card, and circuit of the PBX. In the third column, a user group (UGP) is listed. User groups are classes of telephones that have the same behavior. Typically, users groups are named using number, such that, for example, user groups may be named user group "4", user group "52", and user group "96". User groups describe groups of telephones and their feature differences. For example, one user group may be a set of lobby telephones while another user group may be a set of personal telephones. The user group of the personal telephones may be permitted to make unlimited long distance calls, while this may be prohibited in the user group of the lobby telephones. Other information for each telephone is available on the PBX, but depending on the type and brand of PBX typically this is all that the ET server 200 requires in order serve as a translator between an ET client and a PBX.

IV. Enhanced Telephony (ET) Method and Features

The main functions of the ET server 200 are to control a telephone extension as requested by an ET client computer and to notify the ET client of telephone events at an extension. As used in this specification, the term "telephone extension" can mean both the telephone extension connected to the PBX and a telephone connected to the extension. FIG. 6 is a general flow diagram illustrating a general overview of the ET method. Initially, ET servers come online and attach to the PBX (box 600). This attachment to the PBX is performed by downloading all the appropriate data from the PBX switch databases. This allows each of the ET servers to obtain switch database information from the PBX that the ET server services. It should be noted that the ET server may already be online and received the updated switch database information from the PBX on a periodic basis. Next, ET client software is installed on an ET client computer (box 610). This ET client software contains an ET user interface that integrates computer and telephony features and allows the ET client computer to communicate with an ET server. The ET client and user interface are described in co-pending application Ser. No. 10/445,395 by Cadiz et al., entitled "Enhanced Telephony Computer User Interface Allowing User Interaction and Control of a Telephone Using a Personal Computer" filed on May 20, 2003.

The ET client then performs a service discovery step. As there typically are multiple ET servers in an ET system for an enterprise, this service discovery queries each of the ET servers for the ET server that services the extension associated with the ET client (box 620). More specifically, the service discovery step queries each server to check if the PBX connect to the server services the desired extension. If not, then the ET client queries the next ET server, until the correct PBX and associated ET server is found. Next, the ET client registers with the ET server (as discussed below) so that the PBX and ET server can associated the correct ET client with the corresponding telephone extension (box 630). It should be noted that there may be several ET clients for a particular extension. Once the ET client is registered, the ET server can control the associated extension as requested by the ET client (box 640). Moreover, the ET server can notify the ET client (or clients) of telephone events at that extension, such as an incoming call (box 650).

ET Server Control of a Telephone Extension

One of the main functions of the ET server is to control a telephone extension when requested by an ET client computer. The following actions can be performed on a given telephone extension using the ET server:

- pick up the telephone (pick up line, switch on speakerphone)
- hang up the telephone (hang up line, switch off speakerphone)
- place a call, pick up if necessary
- put current call on hold
- take current call off hold
- cancel an action that is in progress, e.g. transfer
- initiate a telephone conference call
- join a caller into an existing conference call
- send a dual tone multi-frequency (DTMF). The DTMFs are tones that allow the telephone to communicate with the PBX
- switch the do not disturb (DND) mode of the telephone on or off. The DND mode means that all incoming calls go straight to voice mail without ringing the target telephone
- switch the call forward mode for the telephone on or off
- display text on the screen of the telephone
- transfer a current or incoming call before (blind transfer) or after (normal transfer) the call is answered. Blind transfer occurs while the telephone is ringing, while the normal transfer occurs after the telephone is answered.

Figure 7:
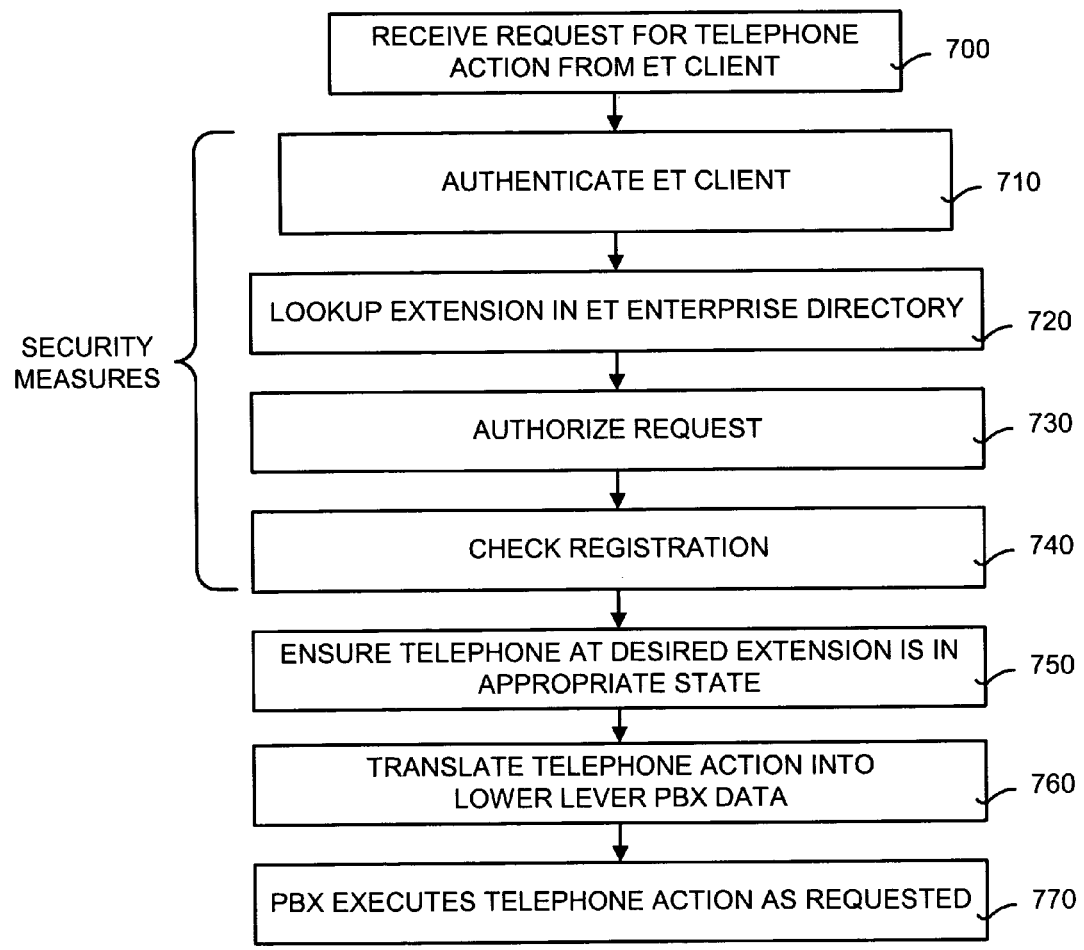
FIG. 7 is a general flow diagram illustrating a general overview of the telephone extension control process.

FIG. 7 is a general flow diagram illustrating a general overview of the telephone extension control process. This telephone extension control process is performed by the ET server to execute telephone actions on the PBX. The process begins by receiving a request from an ET client for a telephone action to be performed (box 700). Next, security measures are performed to ensure a secure transaction. These security measures are noted in FIG. 7. In general, security measures are important for at least two reasons. First, security measures ensure that a person can only control the telephones that they are authorized to control. Second, security measures ensure that a person is actually who they claim. This prevents persons from pretending to be someone else and controlling that person's telephone. These security measures are discussed further below. It should be noted that in some embodiments the security measures may be eliminated.

The security measures include the following processes. Initially, the ET client is authenticated (box 710). This means that the ET client, when connecting to the ET server, provides authentication credentials to the ET server. Without these credentials the ET server will reject any request made by the ET client. Next, based on this authentication, the extension associated with the ET client is looked up in an ET enterprise directory (box 720). The ET enterprise directory is discussed in detail below. From this directory, the ET server can determine whether the ET client is authorized to contact the desired extension or outside telephone number. The ET server then authorizes the request (box 730). Next, the ET server checks to ensure that the ET client is registered (box 740). These security measures help to prevent unauthorized use by others.

After the security measures, the ET server ensures that the telephone at the extension associated with ET client is in an appropriate state (box 750). For example, a call cannot be placed if a call is already in progress at the extension. The ET server then translates the desired telephone action in lower-level PBX data that can be understood by the PBX (box 760). The PBX then executes the desired telephone action as requested by the ET client (box 770).

ET Server Notification of a Telephone Event

The ET server also notifies ET clients registered for a certain extension of telephone events pertaining to that extension (such as an incoming call). This ET client notification process allows an ET client, through a user interface, to interact with a user. For example, when an incoming call is received, the user interface of the ET client provides an incoming call notification to a user.

The following is a list of telephone-related events that are forwarded from the ET server to ET clients registered for a given extension:

- phone was picked up
- phone was hung up
- outgoing call initiated from telephone
- incoming call, telephone ringing
- incoming call aborted, telephone not ringing anymore
- phone answered an incoming call
- current call is put on hold
- current call is taken off hold
- conference call is being initiated
- a caller is joining the conference
- a caller is departing the conference
- phone has been put into do not disturb (DND) mode
- phone has been taken out of DND mode
- phone has been put into call forward mode
- phone has been taken out of call forward mode Some of the above events contain additional information. For example, the incoming call event contains information about the caller, such as caller identification (ID) and caller name. Note that events will be sent to the ET client regardless if the event was caused by an action directly on the telephone (such as a user picking up the handset and dialing via the telephone's dial pad), or if it was initiated through the user interface of the ET client (e.g. ET client told ET server to place a call).

Figure 8:
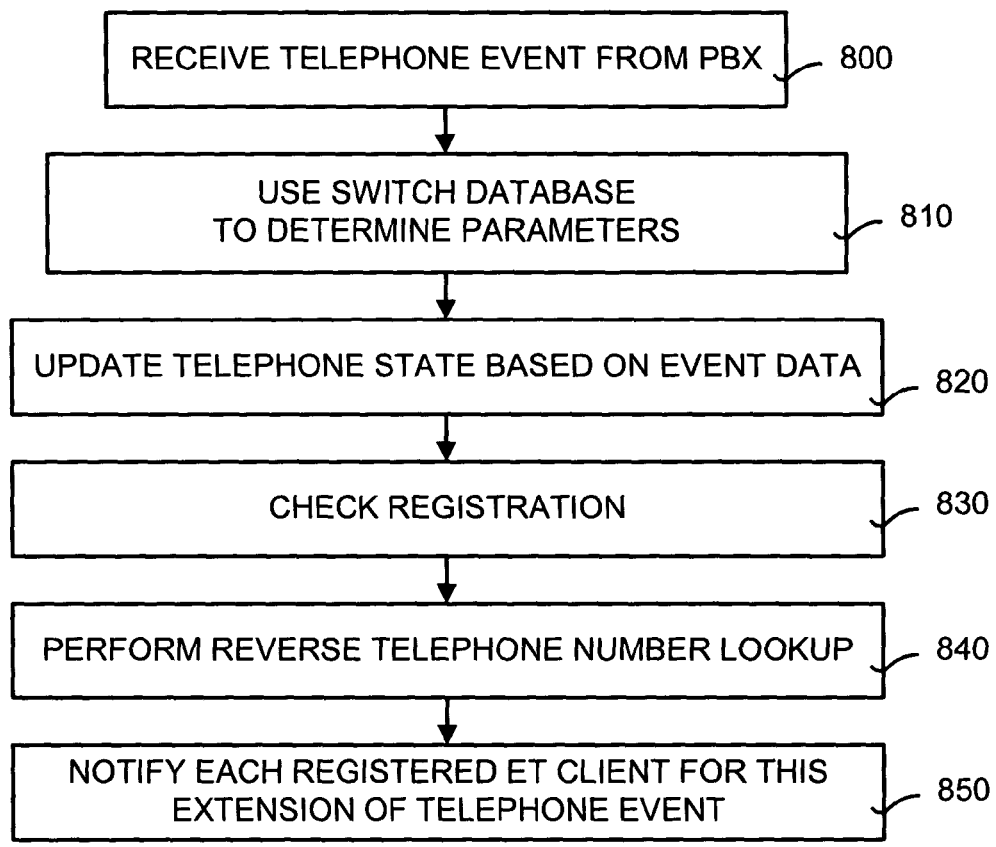
FIG. 8 is a general flow diagram illustrating a general overview of the ET client notification process.

FIG. 8 is a general flow diagram illustrating a general overview of the ET client notification process. This client notification process is performed by the ET server to notify registered ET client of telephone events pertaining to a given extension. The process begins by the ET server receiving a telephone event from the PBX (box 800). This notification is received by the ET server as lower-level PBX data. The switch database is used to determine parameters of the telephone event, such as the intended extension and the type of event (box 810). Next, the telephone state of the extension is updated based on the telephone event (box 820). A check is made to determine whether any ET clients are registered for the extension (box 830). Using the ET enterprise directory, a reverse telephone number lookup is performed to determine the identity of the incoming caller (box 840). Each registered ET client for a given extension then is notified of the telephone event by the ET server (box 850).

ET Client Registration

For the above ET client notification mechanism to work, the ET server must know about ET clients that are running and how to reach them. Therefore, ET clients are required to register themselves with the ET server in order to receive telephone events. Therefore, when an ET client starts, it contacts the ET server and registers itself with the following information: (a) the extension of the telephone with which ET client is being used; (b) the ET client's callback URL (Remoting End Point and IP Address) to which to send notifications; (c) the name of user and the machine that is running the ET client; and (d) versioning information. After registration, the ET server will attempt to notify all clients that are registered for a certain extension about telephone events for this extension.

The ET server keeps track of all ET clients for all extensions that the ET server services. ET clients also are responsible for unregistering themselves. In addition, to avoid stale clients, the server may unregister an ET client under the several circumstances. For example, if the if the ET client is no longer reachable or if the ET client has not updated its registration after a certain time period, then the ET client may be unregistered by the ET server.

ET Enterprise Directory

Typically an enterprise will have a database that contains information about employees and their extensions, as well as other types of information such as office location and job title. However, in order to provide quick service to a requesting ET client, a search of the enterprise database typically is not fast enough. In order to overcome this problem, the ET system and method includes an ET enterprise directory. The ET enterprise directory contains much of the same information as the enterprise database. However, the ET enterprise directory is normalized and indexed so that information may be accessed quickly and thus provided quickly to an ET client. This allows a user to quickly obtain desired information through the ET user interface.

The ET enterprise directory obtains its information from the enterprise database. The ET enterprise directory is updated periodically (e.g. on a weekly basis) with feeds from the official enterprise database. The ET enterprise directory is used for at least three purposes: (1) reverse phone number lookups (e.g. caller ID); (2) searches from ET clients; and (3) authorization to control/monitor telephone extensions. The following data for each person and entity (e.g. conference room, etc) may be contained in the is kept in the ET enterprise directory:

First Name
Last Name
Alias/Nickname
Telephone Number
Title
Manager
Department
Office Location Reverse Telephone Number Lookups Even though the enterprise databases typically are available, they do not fully meet the ET system and method requirements. Specifically, ET server needs a way to do reverse phone number lookups against the enterprise database. For example, this is required when an incoming telephone call is received and the caller ID information is to be resolved to an employee or entry in the enterprise database.

In order to be able to perform a query based on the telephone number, an ET enterprise server is created. The ET server parses and normalizes all telephone numbers in the ET enterprise directory and keeps them indexed in their normalized form. Hosting the ET enterprise directory in memory on the ET server is advantageous since the caller ID (usually just a phone number) can quickly be converted as it is received from the PBX, without requiring additional server round trips.

ET Client Search Requests

The ET enterprise directory also handles searches from ET clients. In order to accommodate fast searches, the ET client access patterns are analyzes such that the indices and in-memory data structures of the ET enterprise directory may be tweaked for best performance. Specifically, the ET enterprise directory is optimized for people lookups when only parts of a persons name may be known, or when other data such as office location, title, etc. is known. The directory will return all likely matches to give the user a better chance of finding the correct person.

Authorizing Extensions

The third use for the ET enterprise directory is authorization. When an ET client tries to register with the ET server to monitor a certain extension, or an ET client tires to control a certain extension, the ET enterprise directory is consulted to make sure the request is authorized. In particular, the telephone number of the person who is making the request is looked up after the identity of the person has been verified via authentication. The ET server authorizes such a request for a given extension only if the telephone number (extension) that is listed in the ET enterprise directory matches the extension that is specified in the request.

Security Features

Unauthorized access and usage is always a concern. To alleviate this problem, the ET server addresses security and privacy concerns as follows. First, authentication and authorization are used to ensure that people only control and monitor their own telephones, or telephones that they have been specifically authorized to control and monitor. This is to avoid scenarios, for example, where employee X can monitor or control the phone of his or her manager. Second, secure connectivity between an ET client and an ET server is used. This ensures that no third party that may have access to the network can inspect and understand the data that is flowing between a certain ET client and ET server. This avoids scenarios where the network could be sniffed to find out who is calling a certain extension, who is being called from a certain extension, or whom a certain user is searching for in the ET enterprise directory hosted on the ET servers. Finally, to detect potential Denial of Service attacks (DoS), each ET server has performance counters that reflect the number of requests per second, number of connected clients, and other data. These counters are monitored to ensure that they stay within a reasonably range. To detect other failures or events that may result from security violations, the ET server generates log output of all its activity, and it writes error and warning messages into the system's event log.

User Data Transfer

As stated above, a direct virtual connection is useful for the screen sharing feature and easy transfer feature of the ET client. The user data transfer feature of ET server allow direct virtual connection to be established between one or more ET clients. This establishes a peer-to-peer relationship between the ET clients. The ET server facilitates such communication and discovery functions. One ET client can request to send data to another ET client, where the other ET client is identified by its extension. The sending client will contact the ET servers one after the other until the one servicing the given extension is found. That server then forwards the data to the client(s) that is registered for the destination extension. If more than one ET client is registered for a given extension, then all clients will be notified. Since this involves several network roundtrips, ideally this mechanism should only be used for service discovery, where the first client sends its own URL or remoting endpoint to the other client(s) via the server, and then switch to a peer-to-peer communication model.

The user data transfer feature is useful, for example, when initiating a screen sharing session when using ET and while on the phone with somebody. In this case, party A selects the screen sharing option in the UI of his/her ET client. That client now needs to establish contact with the ET client of party B. Specifically, client A needs to try to send user data with its own URL or remoting endpoint to client B. However, all client A knows about client B is the extension that it is handling (e.g. extension of party B), and not the machine name or address. To reach the computer of client B, client A contacts each ET server one by one until it finds the server that is handling party B's extension. Once found, the ET server then forwards the user data to client B. Through the ET user interface, Client B may show a confirmation dialog to the user, indicating that a screen sharing session is requested by party A. If accepted by party B, client B now contacts client A directly without going through the server, and the communication continues in a peer-to-peer fashion to coordinate the screen sharing.

Telephone States

The ET server keeps state for each of the extensions that it services. The ET server recognizes the following telephone states for each extension: (a) whether the telephone is On/Off hook; (b) whether the extension is being called; (c) whether the extension is making a call; (d) whether a call is on hold; and (e) if the extension is in a conference call.

For example, if the extension is on hook or off hook or if the extension is in a call. This telephone state is used to ensure that the proper commands are executed on a given extension. By way of example, if a user picks up the handset and then places a call through the user interface of ET client, the line no longer needs to be picked up by the ET server and the speakerphone (assuming that the telephone is a speakerphone) no longer needs to be toggled. Similarly, if a telephone is ringing, picking up the line will answer the telephone versus just taking the telephone off hook. Keeping the correct status for a telephone extension and adjusting the commands to the telephone and PBX accordingly is required to ensure smooth operation.

The state of a telephone extension can be exposed to ET clients or other client computers. For example, ET clients benefit from this during startup, when the current state of the telephone is unknown. Such state information could also be exposed to other systems that may help the user reach another person more effectively. By way of example, if such a system detects that the other person is on the telephone, it may make certain recommendations to the user, such as call back later or check the user's calendar information for availability.

ET Client-Related Features

The ET system and method also includes features that enable an ET client to interact with the ET server. These features will now be described.

Service Discovery

As outlined above, when an ET client starts up, it must determine the extension for the user, and it must connect to the correct ET server. A list of all ET servers is stored on the client (in the registry) and is installed with the ET client application. The first step is to try to connect to the ET enterprise directory to determine the user's extension. The directory on all ET servers is identical. If possible, the ET client will try to connect to the ET server that has serviced the user's extension before (if known). Otherwise, the client randomly picks a server. The ET client then requests the user's extension from the directory. The client then tries to find and connect to the server that services the user's extension. The client will try each ET Server on the list until it finds the one servicing the user's extension that accepts the client's registration. Once registered, the client will remember which server it is connected to so that future startups can be accelerated. After these steps, the client is successfully registered with the ET server and the service discovery process is completed.

Detecting Network Changes

The ET client will watch for changes in the network, specifically, changes to the IP address list. Watching for network changes results in a much better user experience as the ET client's state can switch quickly to in-service or out-of-service depending on the client's connectivity. Whenever a change occurs, the client will try to check its registration with the server. This is helpful in two typical scenarios where connectivity is either lost or established. By way of example, these two typical scenarios are presented.

In a first scenario, a notebook computer that runs the ET client is out of range of the wireless network. This may occur, for example, as the user is leaving a building. In this case, the client can no longer reach the server, and the service outage is reported to the user. The server will eventually unregister this client since its registration is no longer being checked or updated with the server.

In a second scenario, a computer running the ET client is brought into range of a wireless network that has access to the ET servers. Alternatively, a computer running the ET client is otherwise connected to the network, such as using virtual private network (VPN) to connect to a corporate network. In this case, the client detects this network change, registers with the ET server, and reports the restored service to the user.

Ping Interval

Detecting network changes may not always be enough to determine a break in network connectivity between the ET client and server. In order to fill this gap, a ping interval is defined. The ping interval is a time interval between pings (or checking back with the ET server). The ping interval instructs the client how frequently it should check and update its registration with the server. The ping interval is obtained from the server during the registration process. This check and update gives the ET server an indication that the ET client is still alive. It also allows the client to detect if the server is down for some reason. For instance, the client computer may have been shut down without having a chance to unregister with the server. Or, the server may have become unavailable for reasons such as maintenance or network issues. Detecting such network changes on the client alone would not catch these cases. The length of the ping interval setting may be based on the number of ET clients typically connected to the ET server (to avoid overloading the server with client requests). In a preferred embodiment, the ping interval is approximately a few minutes.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. An enhanced computer telephony integration system, comprising:
   a first telephone having a first telephone extension;
   a second telephone having a second telephone extension;
   a first enhanced telephony server connected to a computer network and servicing the first telephone;
   a second enhanced telephony server connected to the computer network and servicing the second telephone;
   a first enhanced telephony client in communication with the servers via the computer network, the first client being associated with the first telephone extension and for initiating outgoing calls from the first telephone extension;
   a second enhanced telephony client in communication with the servers via the computer network, the second client being associated with the second telephone extension and for initiating outgoing calls from the second telephone extension; and
   a private branch exchange in communication with the first server and the second server and the first and second telephones;
   wherein
      when the first client starts,
         querying by the first client the first server and the second server to determine which server services the first telephone; and
         when the first server indicates that the first server services the first telephone, registering by the first client the first client with the first server;
      when the private branch exchange receives an incoming call for the first telephone at the first telephone extension,
         sending from the private branch exchange to the first telephone a first event indicating that a call is incoming for the first telephone; and
         sending from the private branch exchange to the first server a second event indicating that a call is incoming for the first telephone having the first telephone extension; and
      when the first server receives the second event,
         identifying by the first server the first client registered with the first server to be associated with the designated telephone extension; and
         relaying by the first server an indication of the second event to the first client;
      when the first client receives the indication of the second event,
         providing by the first client to a user information relating to the call that is incoming to the first telephone;
         receiving by the first client from the user an indication to control the first telephone by performing an action; and
         forwarding by the first client to the first server an indication of the action to be performed to control the first telephone;
      when the first server receives the indication of the action,
         translating by the first server the action into one or more commands of the private branch exchange; and
         sending by the first server the translated one or more commands to the private branch exchange to effect controlling of the first telephone as indicated by the user at the first client
      when the first client receives from the user a request to place an outgoing call via the first telephone having the first telephone extension,
         sending by the first client to the first server an event initiating an outgoing call from the first telephone having the first telephone extension; and
         when the first server receives the event, relaying by the first server the event to the private branch exchange so that the private branch exchange can place the outgoing call from the first telephone having the first telephone extension.

2. The enhanced computer telephony integration system of claim 1, further comprising a translation module residing on the first server that translates lower-level data that the private branch exchange understands into higher-level data that the first client understands.

3. The enhanced computer telephony integration system of claim 2, further comprising a switch database that facilitates translation by the translation module.

4. The enhanced computer telephony integration system of claim 3, wherein the switch database contains a list of telephone extensions serviced by the private branch exchange.

5. The enhanced computer telephony integration system of claim 3, wherein the switch database contains information about a physical connection of an extension serviced by the private branch exchange.

6. The enhanced computer telephony integration system of claim 3, wherein the information in the switch database includes PBX-specific parameters used by the translation module to perform the translation.

7. The enhanced computer telephony integration system of claim 6, wherein the translation module extracts the PBX-specific parameters from the lower-level data to translate the lower-level data into higher-level data.

8. The enhanced computer telephony integration system of claim 5, wherein the information includes at least one of: (a) port number; (b) cabinet number; (c) shelf number; (d) card identification; (e) circuit identification.

9. The enhanced computer telephony integration system of claim 3, wherein the switch database contains user groups for each extension serviced by the private branch exchange.

10. A method performed by a servicing server for controlling a telephone connected to a private branch exchange based on actions submitted by a user to a client, the client and the private branch exchange connected to a plurality of servers including the servicing server, wherein the client, the servers, and the private branch exchange are computing devices, the method comprising:
   providing to the servicing server an indication that the servicing server services the telephone;
   receiving by the servicing server a query sent from the client to each server for the client to determine which server services the telephone;
   in response to receiving the query, sending by the servicing server to the client an indication that the servicing server services the telephone as indicated by the provided indication;
   receiving by the servicing server a request sent from the client to register the client with the servicing server; and
   in response to receiving the request, registering the client to be associated with the telephone;
   receiving by the servicing server a notification from the private branch exchange of an incoming call to the telephone, the notification being sent by the private branch exchange to both the telephone and the servicing server;

determining by the servicing server the client that is associated with the telephone as indicated by the registration;

after determining the client that is associated with the telephone, sending from the servicing server to the client a notification that a call is incoming to the telephone;

receiving by the servicing server an indication of an action sent from the client, wherein the client received an indication of the action from a user in response to providing an incoming call notification to the user; and upon the servicing server receiving the indication of the action sent from the client,
  translating by the servicing server the action into one or more commands of the private branch exchange; and
  sending by the servicing server to the private branch exchange the translated one or more commands to effect controlling of the telephone as indicated by the user at the client.

11. The method of claim 10, further comprising translating lower-level data that the private branch exchange understands into higher-level data that the first client understands.

12. The method of claim 11, further comprising providing a switch database that facilitates translation of the lower-level data into the higher-level data.

13. The method of claim 12, wherein the switch database contains a list of telephone extensions serviced by the private branch exchange.

14. The method of claim 12, wherein the switch database contains information about a physical connection of an extension serviced by the private branch exchange.

15. The method of claim 12, wherein the information in the switch database includes PBX-specific parameters used by the translation module to perform the translation.

16. A servicing server for controlling a telephone connected to a private branch exchange based on actions submitted by a user to a client, the client and the private branch exchange connected to a plurality of servers including the servicing server, wherein the client, the servers, and the private branch exchange are computing devices, comprising:

an indication that the servicing server services the telephone;

a component that
  receives a query sent from the client to each server, the query sent for the client to determine which server services the telephone;
  in response to receiving the query, sends to the client an indication that the servicing server services the telephone as indicated by the indication;
  receives a request sent from the client to register the client with the servicing server; and
  in response to receiving the request, registers the client to be associated with the telephone;

a component that receives a notification from the private branch exchange of an incoming call to the telephone, the notification being sent by the private branch exchange to both the telephone and the servicing server;

a component that determines the client that is associated with the telephone as indicated by the registration;

a component that sends from the servicing server to the client a notification that a call is incoming to the telephone after determining that the client is associated with the telephone;

a component that receives an indication of an action sent from the client, wherein the client received an indication of the action from the user in response to providing an incoming call notification to the user; and a component that, upon receiving the indication of the action sent from the client,
  translates the action into one or more commands of the private branch exchange; and
  sends to the private branch exchange the translated one or more commands to effect controlling of the telephone as indicated by the user at the client wherein the components are implemented as instructions stored in memory for execution by a processor of the servicing server.

17. The servicing server of claim 16, further comprising a component that translates lower-level data that the private branch exchange understands into higher-level data that the first client understands.

18. The servicing server of claim 16, further comprising a switch database that facilitates translation of the rower-level data into the higher-level data.

19. The servicing server of claim 18, wherein the switch database contains a list of telephone extensions serviced by the private branch exchange.

20. The servicing server of claim 18, wherein the switch database contains information about a physical connection of an extension serviced by the private branch exchange.

21. The servicing server of claim 20, wherein the information in the switch database includes PBX-specific parameters used by the translation module to perform the translation.

* * * * *